(12) United States Patent
Joseph et al.

(10) Patent No.: US 8,458,015 B2
(45) Date of Patent: Jun. 4, 2013

(54) METHODS AND APPARATUS FOR ANALYZING USER INFORMATION TO IDENTIFY CONDITIONS INDICATING A NEED FOR ASSISTANCE FOR THE USER

(75) Inventors: Kurt M. Joseph, Austin, TX (US); Steven Belz, Cedar Park, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 791 days.

(21) Appl. No.: 12/349,082

(22) Filed: Jan. 6, 2009

(65) Prior Publication Data

US 2010/0174572 A1 Jul. 8, 2010

(51) Int. Cl.
*G06Q 30/00* (2006.01)

(52) U.S. Cl.
USPC .................. 705/9; 705/2; 705/3; 379/201

(58) Field of Classification Search
USPC .......................... 705/2, 3, 9; 379/201
See application file for complete search history.

(56) References Cited

U.S. PATENT DOCUMENTS

2007/0280462 A1* 12/2007 Neece ....................... 379/201.01
2008/0021731 A1* 1/2008 Rodgers ........................... 705/2

* cited by examiner

*Primary Examiner* — Nga B. Nguyen

(57) ABSTRACT

Systems and techniques for analyzing information relating to a user to determine whether the user requires assistance. Information for a user is received from sources selected to provide information relating to the user's activities and analyzed to determine whether conditions exist indicating a possible need for assistance for the user. User location, motion, and activity information is received and analyzed against expected information stored in the user profile and analyzed to determine if assistance is needed. If a determination is made that the user's behavior indicates that assistance may be needed, communication is initiated to summon appropriate assistance.

17 Claims, 2 Drawing Sheets

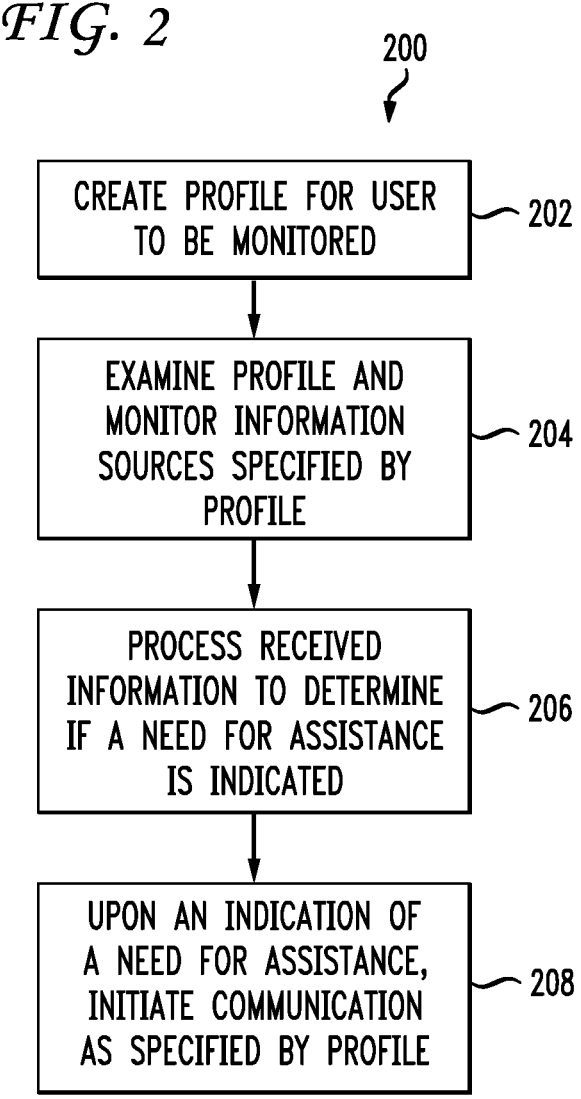

METHODS AND APPARATUS FOR ANALYZING USER INFORMATION TO IDENTIFY CONDITIONS INDICATING A NEED FOR ASSISTANCE FOR THE USER

FIELD OF THE INVENTION

The present invention relates generally to improved systems and techniques for communication. More particularly, the invention relates to monitoring activities of a user and communicating with others as to the condition of the user in circumstances prescribed by the user. Such circumstances include conditions indicating a need for assistance for the user.

BACKGROUND OF THE INVENTION

Individuals living in present day society are frequently surrounded by devices that allow communication with others from nearly any location, with these devices or other devices also being able to gather large amounts of information relating to the activities and movements of the user. A user may carry a global positioning system (GPS) receiver, and a number of wireless telephones have such receivers built in. A user's home may include various sensors and devices that may be monitored by the user's personal computer, and which may compile significant information about the state of the user's surroundings that can be provided by the user.

Many individuals spend considerable time alone and engage alone in numerous activities, and nearly every individual spends at least some time alone. Everyone is subject to danger of one sort or another, whether from crime, accident, or sudden onset of illness, and in many such cases, rapid assistance is highly beneficial.

SUMMARY OF THE INVENTION

Among its several aspects, the present invention recognizes that the information gathering and communication devices surrounding many individuals make it possible to monitor the user's activities and conditions and summon assistance if the user's condition indicates danger. A user's presence in or proximity to his or her home can be monitored, either through a user's GPS device or a proximity sensor at the user's home. Similarly, a user's presence in or proximity to his or her automobile can be monitored. A user's movement, location, speed, and duration of stops can be monitored during a user's activities, and appropriate action can be taken if unusual patterns of movements and activities indicate a need for assistance.

In one embodiment of the invention, a user's personal communication device communicates with other devices and sensors surrounding the user and analyzes the information. Analysis may take into account numerous user behaviors, such as a user's failure to arrive at or leave particular locations, such as home or a car, an attainment of excessive speed while engaging in outdoor activities, a failure to move for excessive periods while engaging in such activities, or any of numerous activities and combinations of activities that may indicate distress. A user profile may be maintained for a user and specific conditions may be explicitly set out in the profile as indicating distress and the nature of the distress and appropriate actions may also be set out. In addition or as an alternative, the user's expected behavior patterns may be described or otherwise represented in the profile and deviations from such expected behavior patterns may be analyzed to determine if such deviations indicate distress. The expected behavior patterns may be explicitly described through manual entries, or may be developed through learning, which may suitably take place through observation of user behavior as indicated by information received from various sources, and the analysis of that behavior to develop expectations relating to the user's behavior under various circumstances.

If the personal communication device determines that the user may be in distress, it may behave as indicated in a user profile, such as phoning the user and, if the user fails to respond, phoning a spouse, a friend, or emergency assistance, as indicated by the user profile.

A more complete understanding of the present invention, as well as further features and advantages of the invention, will be apparent from the following Detailed Description and the accompanying drawings.

BRIEF DESCRIPTION OF THE DRAWINGS

FIG. 2 illustrates a process of user monitoring according to an aspect of the present invention.

DETAILED DESCRIPTION

Figure 1:
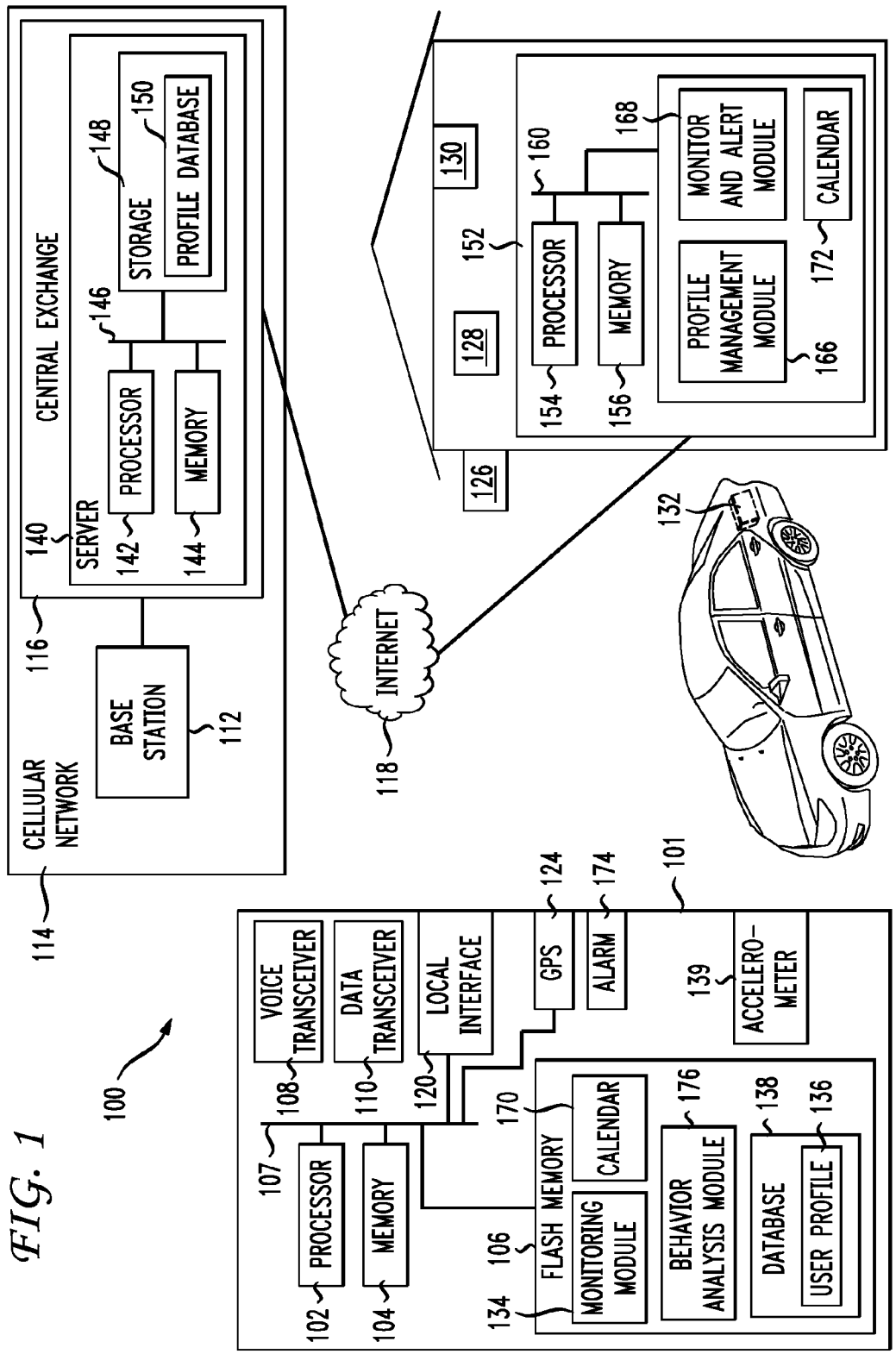
FIG. 1 illustrates a system of user monitoring according to an aspect of the present invention.

FIG. 1 illustrates a system 100 of user monitoring according to an aspect of the present invention. The system 100 includes a personal communication and data processing device 101. The device 101 provides communication and data processing capabilities and is capable of receiving information from various devices, such as proximity indicators and location detectors, used to monitor the movements and actions of a user, but it will be recognized that the device 101 may include its own elements, such as a GPS receiver, used to monitor a user, and also that the various capabilities described here as belonging to a single device may be divided among different devices. For example, the device 101 is described here as receiving information used to monitor a user, performing processing needed to determine whether a user may need assistance, and placing a call for assistance upon determination that a need exists, but it will be recognized that receiving the data may be separated from processing the data and placing a call for assistance. The device 101 may, for example, simply transmit collected data to a central server for processing, and the central server may initiate any needed assistance call. Such an arrangement may help provide security against failure resulting from damage to the device 101.

The device 101 may suitably comprise a processor 102, memory 104, and storage, such as flash memory 106, communicating over a bus 107 with one another and with a voice transceiver 108 and a data transceiver 110. The data transceiver 110 manages transmission and reception of packet switched data. The device 101 communicates with a base station 112, which maybe one of a number of base stations comprising a cellular network 114, in which base stations such as the base station 112 communicate with a central exchange 116. The central exchange 116 may provide access to the public Internet 118 for the devices served by the network 114.

The device 101 further comprises a local data interface 120, which manages communication with local devices such as infrared or BLUETOOTH enabled devices that may be used to communicate data of interest. In the present exemplary embodiment, the device 101 includes a GPS receiver 124, but may also communicate with an external GPS receiver using the local data interface 120. The local data interface 120 may also be used if a device such as the device 101 is designed without its own onboard GPS receiver. The local data interface 120 may communicate with proximity and activity sensors such as a first proximity sensor 126 at the exterior of a user's home, a second proximity sensor 128 at the interior of a user's home, a motion sensor 130 at the interior of a user's home, and an auto monitor 132 in a user's automobile, which may communicate proximity, opening of the door, placing weight on the seat, starting the engine, and other details relevant to determining a user's activities and condition in and around an automobile.

The device 101 comprises a monitor and alert module 134, which may suitably be implemented as software comprising a program of instructions stored in the flash memory 106 and transferred to memory 104 as needed for execution by the processor 102. The monitoring module 134 manages the receipt, and active gathering, of information from the various sensing devices and processes the information to determine the condition of the user. The monitor and alert module 134 may receive timing information from a clock, such as a clock used by the GPS receiver 124, and may use the timing information to determine time of day in order to note what information to expect and to actively request, and may also use the timing information to measure time between events or duration of conditions. The monitor and alert module 134 may compare indications received from the various sensors and monitoring devices against expected patterns which may be stored in user profiles, such as the profile 136 stored in a database 138. The profile 136 for the user may include personal data relating to the user, such as name, address, contact information, and information useful in case of need for assistance. Such information may include physician name and contact information, currently prescribed medications, medication allergies, and relevant medical history, such as any current illnesses or abnormal conditions. The profile 136 identifies devices from which information is to be obtained, and for each device identifies whether information is to be passively received or actively gathered, the mechanisms by which communication with the devices is to occur, and the timing surrounding the receiving or gathering of information. Such timing includes time intervals for receiving information and expected times at which information is to be received, if any. The profile 136 also lists conditions or events that may indicate a need for assistance, with actions to be taken in case such conditions or events occur. The actions to be taken may be generalized actions to be taken each time assistance is needed, or particular actions may be associated with categories of events or conditions or with specific events or conditions. Typically, events or conditions will be related to user behavior as it compares to expected patterns of user behavior, and such events or conditions will reflect characteristics of the user's presence at particular locations, the user's movements, or combinations of presence and movements. User behavior will be compared against expected user behavior, with expectations frequently being based on past user behavior. Expectations may be developed through learning by observation of user behavior, or through parameters entered as direct user input.

For example, a concern of many people living alone is to become disabled at home through sudden onset of an illness or accident and to be unable to summon assistance. People typically move about their homes, turning electronic devices on and off, engaging in communication with others, or simply moving about. The profile 136 may therefore include a record specifying that a failure to note activity during more than a specified period while the user is at home may indicate a need for assistance. If the sensor 126 indicates that the user is at home but fails to detect motion for more than a specified duration, such as 12 hours, the monitoring module 134 may determine that assistance may be needed and initiate appropriate action. To take another example, a user may go out for a run on Saturday morning, with the run lasting no more than two hours. If the user leaves the house on Saturday, indicated through information from the proximity sensor 126, the GPS receiver 124, or both, or from information from some other combination of devices, and fails to return for a prescribed length of time, the module 134 will note, in accordance with the profile, that the user is overdue. The profile may suitably include provisions for action to be taken in such a case, which may comprise telephoning the user, and, if the user fails to respond, trying again in an hour and alerting a friend if the user again does not respond.

To take another example, a profile may include expected behavior connected with a user's automobile. A user may, for example, be expected to start the automobile engine within 2 minutes of opening the door, and a failure to act as expected may indicate that the user has become a crime victim. Thus, upon the expiration of 2 minutes from the time the user opens the door, the module 134 may initiate a call to the user and, upon a failure to respond, may place an emergency call to authorities, providing location information provided by the GPS receiver 124. Similarly, a failure to enter the user's residence within a prescribed time after arriving home may indicate that the user is a crime victim, and a profile may include provisions for detecting from GPS information or a proximity indicator such as the indicator 126 that the user has arrived at home, and noting that the user's entry has not been detected by the proximity indicator 128 within the prescribed time. The module 134 may direct a response as indicated, such as calling the user and placing an emergency call if the user fails to respond.

Additional information relating to the user's activities and condition may be taken from aspects of a user's movements, with GPS information providing a source of information that can be analyzed to determine a user's movements and to draw conclusions about whether characteristics of the user's movements indicate a need for assistance. The profile 136 may therefore include information such as speed ranges for different activities, and a user's speed, sustained over a period of time sufficient to indicate the type of activity being engaged in, may be used to establish expectations about the user's behavior in the immediate future. For example, a speed range of between 0 and 8 or 10 miles per hour may indicate running, a speed range having a minimum of 5 miles per hour and a maximum of 30 miles per hour with an intermediate range of 10-17 mile per hour being achieved most of the time may indicate cycling, and a speed range of 20 to 60 miles per hour, with the great bulk of the time being at a speed of 30 miles per hour or more may indicate auto travel. Future speed expectations may be determined from the mode of travel. For example, if the user is walking or running, a burst of speed to 20 miles per hour followed by motionlessness may indicate that the user has been struck by an automobile, and if the user is cycling, a burst of speed to 40 miles per hour or more, followed by motionlessness, may indicate that the user has been struck by an automobile or lost control descending a hill. If such scenarios occur, the monitoring module 134 initiates action as indicated by the user profile, for example, calling the user and the calling for emergency assistance if the user fails to respond.

In addition to employing motion information from the GPS receiver 124, the device 101 may also include an accelerometer 139. GPS receivers are frequently unable to detect changes in velocity of short duration, so that a sudden, brief acceleration might not be detected by the GPS receiver 124.

The accelerometer 139, however, may report acceleration, and if an acceleration is detected that is outside nominal parameters, the monitor module 134 may respond by determining that assistance may be needed and may initiate actions to summon such assistance.

The system 100 may also comprise alternative or additional devices to carry out the function of monitoring user activities and conditions and carrying out communications. For example, the exchange 116 may include a server 140 communicating with the device 101 and other devices as needed to provide updates and receive relevant information. The server 140 may suitably include a processor 142, memory 144, and storage 146, communicating over a bus 148, and may store a profile database 150 containing copies of the profile 136 and profiles of other users. The server 140 may provide the ability to update the profile 136. For example, the user may employ a personal computer 152 comprising a processor 154, memory 156, storage 158, and bus 160 and communicating with the server 140 through the Internet 118 or by other means. The server 140 may include a profile management module 166, providing an interface to a user to allow the user to choose scenarios indicating that assistance may be required and to specify details of actions to take in case of each scenario. The interface may present sample scenarios to the user and present options for specifying details, and may in addition or as an alternative provide the option of answering questions relating to the user's daily activities designed to give insight into the user's expected behavior, possible dangers the user may face, the user's health condition, and the nature of events or deviations from expected activities that may indicate a need for assistance.

The profile management module 166 creates or updates the profile 136 based on direct inputs or selections by the user, or through analysis of user inputs, and presents a description of the profile behavior to the user. Upon approval, the profile 136 may be stored in the database 150, and may also be transferred to the device 101. As an alternative, the profile 136 may be generated or updated locally by the personal computer 152 and transferred to the device 101 through the exchange 116 but without involvement by the server 140, or through BLUETOOTH or infrared communication or other suitable means. As a further alternative, the profile 136 may be created or updated using the device 101.

It will further be recognized that monitoring of a user's activities may suitably be conducted independently of the device 101. The computer 152 may implement its own monitor and alert module 168, and the monitor and alert module 168 may receive information from its own selection of information sources, which may also include sources from which the device 101 may receive information.

For example, the monitor and alert module 168 may be able to note whether a user is engaging in household activities, by noting communication between the computer 152 and the sensors 126 and 128 or other household devices, and by noting the presence or absence of user activities associated with the computer 152. As an example, the user may fail to answer a number of landline calls, and this failure may be noted, and the failure may also be noted to be anomalous. As a further example, a user's activities or lack of activities involving the computer 152, such as Internet browsing or the playing of music at particular times may be noted as typical or anomalous. The monitor and alert module 168 may analyze and respond to such information as appropriate. Alternatively, the computer 152 may simply transfer appropriate information to the server 140, to the device 101, or to another suitable device for analysis and action, depending on the specific design and parameters of the computer 152 and other elements of the system 101.

Numerous additional sources of information may be employed. For example, in addition to communication facilities, the device 101 may include features of a personal digital assistant, storing, for example, a calendar 170. A duplicate calendar 172 may be maintained by the computer 152. The calendars 170 and 172 may include information relating to travel plans, appointments, scheduled activities, and similar user activities. Such information can be examined and the results of such examination can be used to determine whether the user has followed the prescribed schedule and whether such failure to follow the schedule indicates a need for assistance. For example, a user may be scheduled to fly to Chicago for a 10:00 AM meeting, after a weekend spent hiking. If the user fails to attend the meeting, the monitor and alert module 134 may direct a call or an alert to the user. For example, the device 101 may include an internal alarm 174, and this alarm may be sounded in such a way that it is difficult to ignore. If the user fails to respond to such an alarm, such a failure may be taken as additional evidence that the user is unable to respond and may need assistance, and the monitor and alert module 134 may take additional action, such as searching the calendar 170 and additional sources for relevant information. The monitor and alert module 134 may direct an inquiry to the airline's flight status website to determine whether the flight departed and arrived as scheduled, may direct inquiries to other communication devices, such as the user's home or auto proximity monitors to determine if the user arrived home, may direct inquiries to hotels at the user's previous hiking destination and the user's Chicago destination, may direct inquiries to the user's hiking companions and attendees at the meeting, and may direct other actions as needed to determine if the user's failure to attend the meeting indicates that the user may be in danger, and may direct communication as needed to obtain assistance.

Past experiences and behavior may be taken into account in determining the significance of behavior patterns and deviations from expectations. For example, a user may frequently arrive at meetings 10 minutes late, or may often fail to promptly clear reminders provided a device such as the device 101. In such an instance, a user's failure to clear a notice may indicate simply that the user is still within the typical time window during which he or she appears at meetings, or that the user is in fact present at the meeting but has not yet cleared the notice. In the first instance, inquiries and other actions may not occur until enough time has passed that it can be confidently expected that the user is overdue. In the second instance, more time may be allowed to elapse, because the user may not in fact be overdue.

On the other hand, a user's behavior may indicate that the user is seldom or never late for meetings, so that any lateness may be cause for concern. Such a determination may be based on observations of user behavior with respect to meetings, with the criteria for making various determinations changing as changes in behavior are observed to occur, and with a number of relevant factors also being taken into account in determining the significance of a behavior or group of behaviors. In the present example, the fact that the user has traveled to reach the meeting may be considered in evaluating whether the trip introduced a greater likelihood of delay, so that the user's lateness is less remarkable. A behavior analysis module 176, therefore, may perform such analysis in order to continuously update a user profile such as the profile 136 with behavioral expectations and rules, and the monitor and analysis module 134 may take such expectations and rules into account in managing its operations, such as determining what information needs to be gathered, how such information is to be interpreted, and what actions are to be taken in response to the information received.

The nature of the activities in which the user is engaged may also be taken into account, and the potential hazards of such activities analyzed to determine the circumstances indicating that the user may need assistance, and also the closeness with which a user may need to be monitored. For example, if the user is hiking in difficult terrain, the device 101 may request that the user indicate his or her status at periodic intervals, such as every hour. In addition, analysis of a user's movements may be influenced by the nature of the terrain or the environment in which the user is located. For example, periods of motionlessness may be regarded differently if the user is hiking in a harsh environment than if the user is fishing in a moderate climate in easy terrain. Information that may be taken into account include historical information relating to the user's experience with the same and similar terrain, and experience of others with the same and similar terrain. The historical information may include information relating to historical patterns of accidents in the environment.

It will be recognized that a device such as the device 101 may conduct observation and analysis of the user's activities and condition, gather needed information, and conduct inquiries and summon assistance, such functions may also be performed by other devices. In some cases, the device 101 may he out of communication range or otherwise unable to communicate, and it may often be desirable for the monitor and alert module 168 to conduct its own independent functions, and that coordination between one or more of the computer 152, the device 101, the server 140, and other appropriate devices may be performed as needed to insure that the needed inquiries and communications take place but are not duplicated.

FIG. 2 illustrates the steps of a process 200 according to an aspect of the present invention. The process may suitably be accomplished using a communication device such as the device 101 of FIG. 1, or other mechanisms such as the server 140 or the computer 152 of FIG. 1, or other suitable devices or combinations of devices. At step 202, a profile is created including information such as personal information for a user to be monitored, identification of devices from which information is to be received in the course of monitoring, expected behavior of the user, conditions or occurrences indicating a need for assistance of the user, and actions to be taken if such conditions occur. At step 204, the profile is examined and sources of information specified by the profile are monitored to gather specified information relating to the user's condition and activities. At step 206, as information is received and events and activities monitored, with information such as indications of use of devices by a user, indications from motion and proximity sensors, location and motion information, and other relevant information being monitored to determine if a likely need for assistance exists. At step 208, upon occurrence of a condition or event indicating a need for assistance, action is taken as specified in the profile.

While the present invention is disclosed in the context of a presently preferred embodiment, it will be recognized that a wide variety of implementations may be employed by persons of ordinary skill in the art consistent with the above discussion and the claims which follow below.

We claim:

1. A method of user monitoring, comprising:
receiving, by a data processing device, behavior information relating to a user's behavior through wireless communication with one or more devices providing information relating to the user, the behavior information including:
scheduled activities retrieved from an electronic calendar feature, and
participation information relating to the user's participation or nonparticipation in the scheduled activities;
analyzing, at the data processing device, the behavior information to compare the user's participation or non-participation in the scheduled activities with expectations relating to the user's participation or nonparticipation in scheduled activities and to analyze deviations from the expectations to determine whether such deviations indicate a need for assistance for the user;
refining, by the data processing device, the expectations relating to the user's participation or nonparticipation in scheduled activities by monitoring additional participation information over time, to produce refined expectations;
analyzing, by the data processing device, subsequent behavior information to compare the user's subsequent participation or nonparticipation in subsequent scheduled activities with the refined expectations and to analyze deviations from the refined expectations to determine whether such deviations indicate a need for assistance for the user;
upon an indication of a need for assistance for the user, initiating, by the data processing device, transmission of a signal to the user; and
based on a failure of the user to respond to the signal, initiating, by the data processing device, communications to summon assistance.

2. The method of claim 1, wherein refining the expectations relating to the user's participation or non-participation in the scheduled activities includes monitoring user behavior with respect to adherence to schedules.

3. The method of claim 1, wherein receiving behavior information relating to the user's behavior includes receiving information relating to the user's pattern of movements and analyzing the user's behavior includes analyzing the user's pattern of movements taking historical patterns of accidents in the user's current environment into account to determine whether the pattern of movements indicates a need for assistance.

4. The method of claim 1, wherein the expectations relating to the user's participation or nonparticipation in scheduled activities are stored in a user profile.

5. The method of claim 1, further comprising summoning assistance upon determination that assistance may be needed.

6. The method of claim 5, wherein summoning assistance comprises analyzing the deviations from the expectations to identify a condition indicating a need for assistance and following procedures stored in a user profile for the identified condition.

7. The method of claim 1, wherein deviations are determined to indicate a need for assistance for the user when the behavior information indicates that the user arrived at a predetermined location but failed to participate in scheduled activities at the location.

8. A tangible computer-usable medium having computer readable instructions stored thereon for execution by a processor to perform a method of user monitoring, the method comprising:
receiving behavior information relating to a user's behavior through wireless communication with one or more devices providing information relating to the user, the behavior information including:

scheduled activities retrieved from an electronic calendar feature, and participation information relating to the user's participation or nonparticipation in the scheduled activities;

analyzing the behavior information to compare the user's participation or nonparticipation in the scheduled activities with expectations relating to the user's participation or nonparticipation in scheduled activities and to analyze deviations from the expectations to determine whether such deviations indicate a need for assistance for the user;

refining the expectations relating to the user's participation or nonparticipation in scheduled activities by monitoring additional participation information over time, to produce refined expectations;

analyzing subsequent behavior information to compare the user's subsequent participation or nonparticipation in subsequent scheduled activities with the refined expectations and to analyze deviations from the refined expectations to determine whether such deviations indicate a need for assistance for the user;

upon an indication of a need for assistance for the user, initiating transmission of a signal to the user; and based on a failure of the user to respond to the signal, initiating communications to summon assistance.

9. The tangible computer-usable medium of claim 8, wherein refining the expectations relating to the user's participation or non-participation in the scheduled activities includes monitoring user behavior with respect to adherence to schedules.

10. The tangible computer-usable medium of claim 8, wherein receiving behavior information relating to the user's behavior includes receiving information relating to the user's pattern of movements and analyzing the user's behavior includes analyzing the user's pattern of movements taking historical patterns of accidents in the user's current environment into account to determine whether the pattern of movements indicates a need for assistance.

11. The tangible computer-usable medium of claim 8, wherein the expectations relating to the user's participation or non-participation in the scheduled activities are stored in a user profile.

12. The tangible computer-usable medium of claim 8, further comprising summoning assistance upon determination that assistance may be needed.

13. The tangible computer-usable medium of claim 12, wherein summoning assistance comprises analyzing the deviations from the expectations to identify a condition indicating a need for assistance and following procedures stored in a user profile for the identified condition.

14. The tangible computer-usable medium of claim 8, wherein deviations are determined to indicate a need for assistance for the user when the behavior information indicates that the user arrived at a predetermined location but failed to participate in scheduled activities at the location.

15. A method of user monitoring, comprising:
receiving, a data processing device, behavior information relating to a user's behavior through wireless communication with one or more devices providing information relating to the user, the behavior information including:
location information indicating a current location of the user, and
historical accident information indicating historical patterns of accidents experienced by persons other than the user at the current location of the user;

analyzing, by the data processing device, the behavior information to determine whether there is an indication of a need for assistance for the user, based on the location information and the historical accident information;

upon the indication of a need for assistance for the user, initiating, by the data processing device, transmission of a signal to the user; and based on a failure of the user to respond to the signal, initiating, by the data processing device, communications to summon assistance.

16. The method of claim 1, wherein receiving behavior information additionally includes receiving historical accident information indicating historical patterns of accidents experienced by the user at the current location of the user.

17. The method of claim 1, wherein receiving behavior information additionally includes receiving historical accident information indicating historical patterns of accidents experienced by the user on terrain similar to a terrain of the current location of the user.

* * * * *